United States Patent Office 3,536,811
Patented Oct. 27, 1970

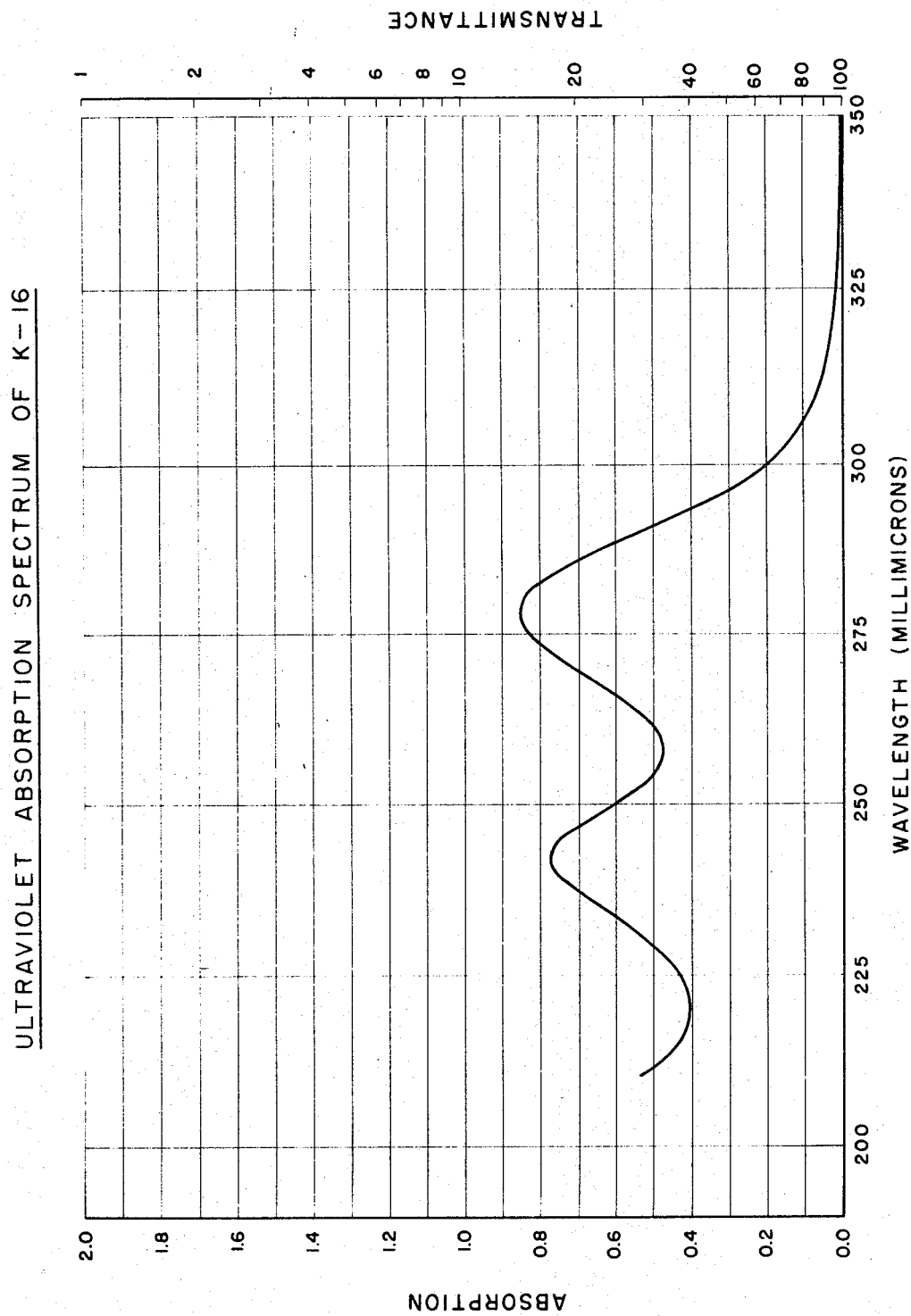

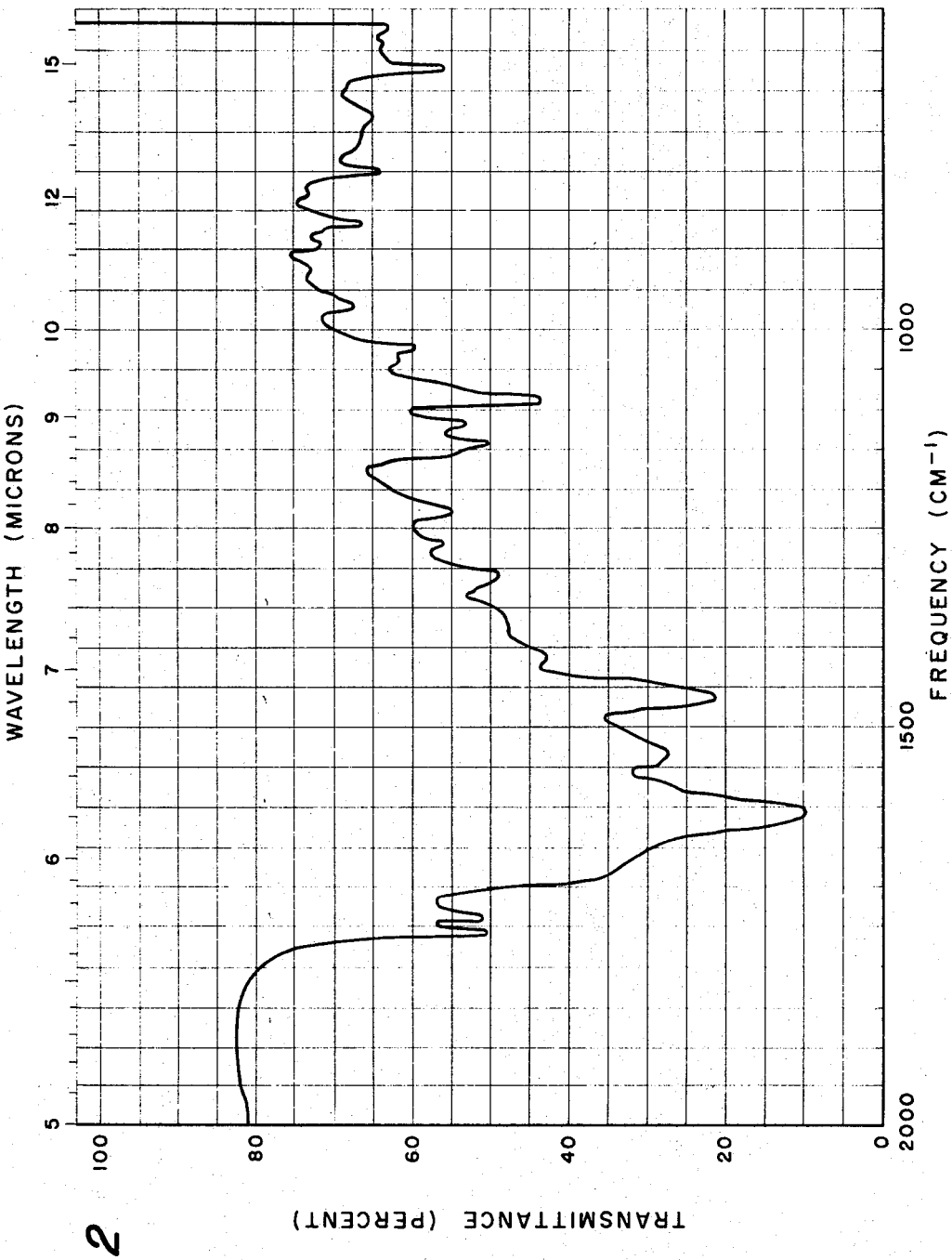

3,536,811
ANTIBIOTIC K–16 AND METHOD OF PRODUCTION
Hendrik Ottens, Delft, and Cornelis Vos, Pijnacker, Netherlands, assignors to Koninklijke Nederlandsche Gist- & Spiritusfabriek N.V., Delft, Netherlands
Filed Jan. 26, 1968, Ser. No. 700,795
Claims priority, application Netherlands, Jan. 27, 1967, 6701356
Int. Cl. A61k 21/00
U.S. Cl. 424—116   6 Claims

ABSTRACT OF THE DISCLOSURE

A new antibiotic substance, designated as K–16 is provided which is effective in inhibiting the growth of protozoa, particularly trypanosoma. The antibiotic K–16 is obtained by cultivating a K–16 producing strain of *Streptomyces rimosus* in an aqueous nutrient medium containing an assimilable source of carbohydrate and an assimilable source of nitrogen and under aerobic conditions until the antibiotic is produced.

BACKGROUND OF THE INVENTION

This invention concerns a new composition of matter and the method of its preparation. In particular, the invention relates to a new antibiotic, to its production by fermentation to methods for its recovery and concentration from crude solutions, and to the preparation of its salts.

The present invention includes within its scope the antibiotic in dilute forms, as crude concentrates and in pure crystalline forms.

SUMMARY OF THE INVENTION

The new antibiotic which is named K–16 is obtained by cultivating under controlled conditions an organism belonging to the genus Streptomyces which has been isolated from a soil sample from the Black Forest, of Germany. According to the invention, to produce K–16, the organism is cultivated in a sterile aqueous nutrient medium with a pH of about neutral, containing an assimilable carbon and nitrogen source, at a temperature between 18 and 37° C. under otherwise suitable conditions.

The new antibiotic is a white crystalline, amphoteric substance, sparingly soluble in water but easily brought into solution by the addition of acid or alkali. The solubility of K–16 in other solvents such as dimethylsulphoxide, dimethylformamide, nitrobenzene, tetrahydrofuran, dioxane, pyridine, acetonitrile, acetone, methylisobutylketone, methanol, ethanol, n-butanol, diethyl ether, benzene and ethyl acetate is moderate to low. The antibiotic contains the elements carbon, hydrogen, oxygen and nitrogen and is opitically active with a specific rotation $[\alpha]_D^{23} = -68.8°$ at a 1% concentration in water, adjusted to pH-7 with ammonia.

FURTHER CHARACTERISTICS OF K–16

An ultraviolet spectrum of K–16 is given in FIG. 1. K–16 dissolved in water at pH 7 shows, in the UV region (210–450 m$\mu$), two absorption maxima, at 242 m$\mu$ ($E_{1\,cm.}^{1\%}$ = about 290)

and at 278 m$\mu$ ($E_{1\,cm.}^{1\%}$ = about 313)

respectively.

The infrared absorption spectrum of K–16 measured with KBr-disc technique which is illustrated in FIG. 2 shows a number of characteristic frequencies at 1761, 1744, 1612 (strong), 1540 (medium), 1466 (strong), 1315, 1234, 1150, 1125, 1094 (medium), 1029, 874, 806 and 681 cm.$^{-1}$.

K–16 gives a positive reaction with ninhydrin and with ferric chloride, it decolorizes potassium permanganate and bromine solutions and gives a red color with concentrated sulphuric acid and Furth-Hermann reagent.

Elementary analysis of three preparations of K–16 resulted in the following figures: C: 38.9–40.4%; H: 5.6–5.9%; N: 13.0–13.5%. From these figures the empirical $C_{14}H_{24-28}O_{12-10}N_4$ may be calculated. In view of results of mass-spectrometric analysis, the formula $C_{14}H_{18}O_{10}N_4$ so far seems to be the most plausible.

The new antibiotic of this invention disintegrates upon boiling in neutral or acidified aqueous solution; in alkaline solution the stability is greater.

Acid hydrolysis of K–16 and thin layer chromatography of the hydrolysate results in a number of ninhydrin-positive substances, two of these being identified as being similar to serine and aspartic acid respectively.

The new antibiotic K–16 has little activity against bacteria and fungi, but shows a very pronounced anti-protozoal activity. In vivo it is active in particular against Trypanosoma. A single intraperitoneal dose of 30 mg./kg. results in a disappearance of all trypanosomes from the blood of mice infected with *Trypanosoma congolense*. A similar effect is obtained by application of the same total dose in smaller portions over a period of three days. The activity against *Trypanosoma congolense* makes K–16 especially useful in the veterinary field for combating sleeping sickness. A suitable daily dose for this purpose is 10–15 mg./kg. s.c. or i.m. For intramuscular administration a depot form of K–16 may be made by suspending the substance in ground-nut oil. Also *Trypanosoma evansi* infected mice are cured by K–16. Furthermore K–16 is effective against *Trypanosoma vivax* and, to a lesser extent, againt *Trypanosoma rhodesiense*. The toxicity of K–16 is low. Determined with mice of the strain RQ and acute LD$_{50}$ is about 1000 mg./kg. after intraperitoneal application. A daily dose of 50 mg./kg. during three weeks did not have any harmful effect on mice of the strain RQ.

THE MICROGANISM

The organism able to produce K–16 in culture was cultivated in a number of nutrient media to study the characteristics of growth and appearance. The results are summarized in the accompanying table. From this investigation it is evident that the organism is characterized by the formation of abundant, mostly white to faintly yellowish-white powdery aerial mycelium. On culture media such as starch agar, calcium malate agar and Czapek glucose, agar, the aerial mycelium consists of fairly long main axes along which apart or in pairs well developed spirals occur. The paired spirals are connected with the main axis by a common short stalk. Often more pairs of spirals are formed at about the same position on the main axes thereby simulating a vertical arrangement. Upon aging these spirals grow together forming clusters. The distance between these clusters is fairly large. At the tip of an aerial hyphe usually a single spiral is formed. The conidia in the spirals are short ellipsoidal. The measurements are about 1 x 0.9 H. The colonies are slightly yellowish to light-brown on culture media containing peptone and grayish to brownish gray on most synthetic media. The formation of a soluble pigment is slight and restricted to a light yellow or light brown coloration on some media. The growth on Czapek saccharose agar is very sparse. With regard to the physiological characteristics: gelatin is hardly liquefied, H$_2$S is not formed and the tyrosinase reaction is negative. The diastatic action and the nitrate reduction are positive, while milk is coagulated and peptonized. From this it may be concluded that the organism described must be regarded as a variety of *Streptomyces rimosus*. It is known that strains of *Streptomyces rimosus* are able to produce various antibiotics such as oxytetracycline, rimocidin (substances that are not produced by the organism of this invention), streptimidone and paromomycin.

A method is described for the production of the antibiotic paromomycin, in the Netherlands patent 101,241 which corresponds to U.S. Pat. No. 2,916,485 from cultures of *Streptomyces rimosus* var. *paromomycinus*.

According to the structure of the aerial mycelium, the appearance and the growth on a number of nutrient media, the K-16 producing organism found by the applicant is only slightly different from *Streptomyces rimosus* var. *paromomycinus* NRRL 2455. Like that organism, the organism found by the applicant produces paromomycin. However the authentic strain of *Streptomyces rimosus* var. *paromomycinus* NRRL 2455 obtained by applicant from the NRRL, under the cultural conditions used by the applicant, does produce paromomycin but not K-16. A viable culture of the organism described is kept in the permanent culture collection of the Centraal Bureau voor Schimmelcultures in Baarn, Netherlands (No. 569.66).

The process of the present invention is not restricted to a microorganism that corresponds to the given detailed description of the aforementioned strain. Another streptomycete isolated by applicant and deposited with the C.B.S. in Baarn, Netherlands (No. 570.66) that also produces the antibiotic K-16 and paromomycin differs from the aforementioned streptomycete with similar characteristics in the following properties:

(a) The formation of the aerial mycelium which is sparser.
(b) The formation of a red pigment on potato glucose agar, on potato slices and in a submerged culture in a liquid medium with glucose, $(NH_4)_2SO_4$, $KH_2PO_4$, cornsteep liquor and chalk.
(c) No reduction of nitrate to nitrite in Czapek-glycerol or Czapek-glucose medium.
(d) No or negligible peptonization of milk.

It is to be understood that the present invention also includes the preparation of K-16 with variant strains obtained by mutating treatments well-known in themselves, such as action of mutagenic agents like mustard gas and the like or by physical influences e.g. ultraviolet light, X-irradiation and the like on these strains or other streptomycetes with similar characteristics insofar as these satisfy the conditions to produce K-16.

TABLE 1

| Nutrient medium | Growth | Soil odor | Soluble pigment | Aerial mycelium | | | Structure | Color of the colony | |
| --- | --- | --- | --- | --- | --- | --- | --- | --- | --- |
| | | | | Amount | Color | Colony | | Top | In reverse |
| Malt peptone agar | Good | Strong | Very little | Very abundant powdery | Snowwhite | Flat hardly folded | Some cerebriformal folds | | Ochre. |
| Glucose asparagine agar | Moderate | None | None | None | | Very small, not sharply edged (like loose flocks) | Flat shining | Light grey | Light grey. |
| Starch agar | Good | Some | Little yellow/beige | Very abundant, powdery | Snowwhite | Small, flat, hardly, folded | Practically unfolded | | Light yellow/beige. |
| Oatmeal agar | do | do | Little light beige | do | do | Flat, hardly folded | Unfolded | | Yellow/beige. |
| Glucose-calcium malate agar | do | Weak | Faint red | Abundant, powdery | do | Very small, fuzzy | do | Brown/beige | Light beige to brown/beige. |
| Sodium citrate agar | do | do | None | Fairly abundant, powdery | do | do | do | Light grey | Light grey. |
| Czapek glucose agar | Moderate | None | None | do | do | Small to very small sharply edged | Some cerebriformal folds | Beige, sometimes with darker center | Grey with grey/brown center. |
| Czapek saccharose agar | Poor | Weak | None | None | | No separate colonies | Diffuse spreading | Light grey | Light grey. |
| Czapek glycerol agar | Good | Fairly strong | Little light yellow | Abundant, powdery | Snowwhite | Small, fairly thick, fuzzy | Weak cerebriformal folded | | Faint yellow to faint brown/yellow. |
| Emerson's agar | do | Mouse odor | Light brown | do | do | Flat fuzzy | Very weak cerebriformal folded | | Light brown. |
| Sabouraud agar | do | do | Faint light yellow | do | do | Round flat, practically unfolded fuzzy edge | Weak cerebriformal folded | | Light yellow. |
| Tapwater agar | Poor | None | None | None | | | Diffuse, spreading | Light grey | Light grey. |
| Nutrient agar | Fairly good | Strong | Very little light yellow | Fairly abundant, powdery | Snowwhite | Very small, fuzzy | Unfolded | do | Light grey to yellow grey. |
| Potato glucose agar | Good | do | Little to none | Abundant, powdery | do | Small, flat, fuzzy | Some cerebriformal folds | | Faint brown/yellow. |
| Potato slices | do | Fairly strong | Grey-green | Abundant | White | | Strongly cerebriformal folded | | |

PRODUCTION OF THE ANTIBIOTIC

The production of K-16 according to the invention takes place by inoculating a sterile aqueous nutrient medium with a culture of one of the streptomycetes mentioned or of a natural or induced mutant thereof and by cultivating this culture for a number of days under aerobic conditions at a certain temperature and pH till substantial amounts of the new antibiotic have been formed. The fermentation may be performed as surface culture or more economically as submerged culture.

The production can take place in a medium that contains 0.5–5% by weight of an assimilable carbohydrate such as starch, glucose and the like and 0.5–3% by weight of a source of assimilable nitrogen compounds like cornsteep liquor, peptone, hydrolyzed casein, fish meal and the like. Although in general the tapwater used contains sufficient amounts of salts and trace elements such substances may be added to the medium if necessary. The aerobic fermentation is accomplished at a temperature of 18–37° C., preferably at about 26° C. dependent on the fermentation conditions in 1–5 days. At the end of the fermentation the mycelium and other solid substances are removed by filtration, centrifugation or another suitable method, if desired, after addition of a filter aid. The filter cake is usually washed with water, and the washings are combined with the original filtrate. The antibiotic desired can be obtained from the combined filtrates as such, or after some purification and concentration, by making use of the known chromatographic separation methods, in particular, by means of adsorption chromatography, gel-filtration and chromatography with acidic or basic ion exchange resins. A method that is preferable consists in an evaporation in vacuo of the culture filtrate at a temperature of 45°–50° C. $\frac{1}{10}$ or $\frac{1}{20}$ of the original volume. By consecutively adding acid and alkali to the concentrate to a pH of 2 and a pH of 10, respectively, inactive substances are precipitated and can be removed by filtration or centrifugation. The antibiotic is then precipitated from solution by a water miscible solvent such as methanol, ethanol or acetone. It proved to be profitable for the subsequent purification with exchange resins to add an amount of a complexing agent, such as the ammonium salt of ethylenediaminetetraacetic acid, i.e. ammonium Versenate to the concentrate prior to the precipitation. The precipitate is dissolved in water at alkaline pH and the solution is passed through a column filled with a strongly basic ion exchange resin of the type Amberlite IRA 402 (in OH form). K-16 is adsorbed on the resin and is separated from a large amount of inactive substances. The resin, loaded with the antibiotic, is washed with water and subsequently the substance is eluted from the resin in fractions by an acid. Acetic acid proved to be particularly well suited for this purpose; ammonium acetate was added to the acid to delay crystallization. By keeping the fraction containing the product overnight in a refrigerator, needle-like crystals of the new antibiotic are formed spontaneously, which can be dried, after filtration and washing with water and methanol. A further purification is accomplished by dissolving the product in water by addition of ammonia, treating the solution with activated charcoal and adjusting the solution to the isoelectric point with an acid.

Some examples with data about the production, isolation and purification of K-16 are given below. These examples have been given solely for the purpose of illustrating the invention, and are not to be construed as limiting the scope thereof in any manner whatsoever.

EXAMPLE 1

Fermentation

Spores from a well developed oatmeal agar culture of *Streptomyces rimosus* C.B.S. 569.66 are transferred under aspectical conditions to an Erlenmeyer flask of 500 ml. containing 100 ml. of a medium of the following composition:

| | G. |
|---|---|
| Peptone | 5 |
| Glucose | 10 |
| Cornsteep liquor (calculated on dry weight) | 3 |
| Sodium chloride | 5 |
| Tapwater to 1000 ml. | |

Prior to inoculation this inoculation medium is adjusted to a pH of 7.2 with potassium hydroxide solution and sterilized for 20 minutes at 120° C. Following the inoculation the culture is cultivated for 72 hours on a rotary shaker at 26° C.

The inoculation culture, thus obtained, is transferred in a concentration of 5% to 500 ml. Erlenmeyer flasks containing 100 ml. of a medium of the following composition:

| | G. |
|---|---|
| Glucose | 30 |
| Cornsteep liquor (calculated on dry weight) | 1 |
| Ammonium sulfate | 5 |
| Calcium carbonate | 8 |
| Potassium dihydrogen phosphate | 0.2 |
| Tapwater to 1000 ml. | |

Prior to inoculation this medium to sterilized for 20 minutes at 120° C. without correction for pH. After cultivation for 72 hours the filtrate of the thus obtained culture is active against *Trypanosoma congolense*. An intraperitoneal dose of 12.5 ml./kg. daily for 4 days cures mice of an infection with *Trypanosoma congolense*.

EXAMPLE 2

Fermentation

From a well-develop agar culture of *Streptomyces rimosus* C.B.S. 569.66 spores are transferred under aseptical conditions to 2 liter Erlenmeyer flasks containing 500 ml. of a sterile aqueous medium of the following composition:

| | G. |
|---|---|
| Malt extract | 15 |
| Peptone | 10 |
| Sodium chloride | 5 |
| Tapwater to 1000 ml. | |

The pH of this medium is adjusted to 7.4 with potassium hydroxide solution and the medium is subsequently sterilized for 30 minutes at 120° C. Following the inoculation the culture is cultivated for 72 hours on a rotary shaker at 26° C. The thus obtained inoculation culture is transferred in a concentration of 6.7% to a stainless steel fermentor tank provided with stirrer and sparger, containing 15 liters of a sterile liquid medium of the following compositions:

| | G. |
|---|---|
| Cornsteep liquor (cauculated on dry weight) | 2.5 |
| Yeast extract | 10 |
| Malt extract | 20 |
| Tapwater to 1000 ml. | |

Prior to inoculation the medium is adjusted to a pH=7 with potassium hydroxide solution and subsequently sterilized for 30 minutes at 120° C. If needed, the pH is readjusted to 7 after sterilization. The cultivation takes place at 26° C. After 24 hours this culture is transferred in a concentration of 10% to a second stainless steel fermentor tank of 100 liters provided with stirrer and sparger, containing 70 liters of a sterile medium of the following composition:

| | G. |
|---|---|
| Cornsteep liquor (calculated on dry weight) | 5 |
| Defatted peanut meal | 20 |
| Potato starch | 10 |
| Sodium chloride | 5 |
| Magnesium sulfate | 1 |
| Potassium dihydrogenphosphate | 0.5 |
| Tapwater to 1000 ml. | |

Prior to inculation the medium is adjusted to a pH=7 with potassium hydroxide solution and sterilized for 30 minutes at 120° C. If needed, the pH is readjusted to 7 after sterilization.

The cultivation takes place at 26° C.

After 72 hours the filtrate of this culture is active against trypanosomes and cures mice of an infection by *Trypanosoma congolense* with an intraperitoneal dose of 6.25 ml./kg. daily for 4 days.

EXAMPLE 3

Isolation and purification of the antibiotic K–16

The grown culture (70 liters) obtained as described in Example 2 is filtered with a filteraid and the filtrate is concentrated in vacuo at a temperature of about 50° C. to 4250 ml.

The acidity of the concentrate is adjusted to a pH of 2 with 36% HCl which results in a precipitation of impurities. The precipitate obtained is removed by filtration and the filtrate is adjusted to a pH of 9.5 with 25% ammonia. Again a precipitate is formed. Following removal of this precipitate 100 g. of ammonium Versenate is added to the filtrate and the solution is diluted with 4 volumes of methanol.

The precipitate containing K–16 is filtered and washed with methanol and finally dried at 50° C. Purification of this crude K–16 preparation is accomplished by passing a 10% solution in 0.5 N ammonia through a column filled with 600 ml. Amberlite IRA 402 (in OH form).

The antibiotic is adsorbed on the resin. Following a washing procedure of the resin with water a fractionated elution with 5 N acetic acid to which 1.5% ammonium acetate has been added is performed. The fraction containing the product is kept for 24 hours at 5° C. during which time needle-like crystals of K–16 are formed. The crystals are separated by filtration, washed with water and with methanol and finally dried. Weight 10.8 g. K–16.

From the mother liquor another 11.0 g. of impure K–16 can be obtained by concentration in vacuo at 50° to $\frac{1}{20}$ of the original volume and delution of the concentrate with 4 volumes of methanol. From this impure product 1.5 g. K–16 can be obtained by recrystallization from water. For a further purification of the total crystalline product (12.3 g.), it is suspended in 50 ml. of water and dissolved by adding concentrated ammonia until the pH=7. After treatment of the solution with activated charcoal the pH of the filtrate is adjusted to 3 with 2 N HCl after which a spontaneous crystallization of K–16 takes place.

After 24 hours at 5° C. the suspension is filtered and the crystals are washed with water and with methanol. After drying 10.4 g. of pure K–16 is obtained with the properties mentioned above.

What we claim and desire to secure by Letters Patent is:

1. Antibiotic K–16, an amphoteric substance with with antibiotic activity against protozoa and trypanosoma, said substance containing by weight about 38.9–40.4% of carbon, about 5.6 to 5.9% of hydrogen, about 13.0–13.5% of nitrogen, the balance being oxygen and having a specific roation $[\alpha]_D = -68.8°$ (concentration 1% in water adjusted with ammonia to pH=7), said substance being sparingly soluble in water, but easily dissolvable in dilute aqueous acid or alkali, moderately to slightly soluble in dimethylsulphoxide, dimethylformamide, nitrobenzene, tetrahydrofuran, dioxane, pyridine, acetonitrile, acetone, methylisobutylketone, methanol ethanol, n-butanol, diethyl ether, benzene and ethylacetate, said substance showing a positive reaction with ninhydrin and ferric chloride, decolorizing potassium permanganate and bromine solutions, showing a red color with concetrated sulphuric acid and Furth-Hermann reagent, and possessing in the ultraviolet region of the spectrum absorption maxima at 424 m$\mu$ and 278 m$\mu$ and possessing the following infrared absorptions (at cm.$^{-1}$) 1761, 1744, 1612 (strong,), 1540 (medium), 1466 (strong), 1315, 1234, 1150, 1125, 1094 (medium), 1029, 874, 806 and 681 measured in KBr.

2. Antibiotic K–16 according to claim 1 in crystalline form.

3. Process for the preparation of antibiotic K–16 as defined in claim 1 which comprises cultivating the *Streptomyces rimosus* strain C.B.S. 569.66 in an aqueous nutrient medium with a pH of about neutral and containing one or more sources of assimilable carbon and assimilable nitrogen under aerobic conditions at a temperature of about 18 to 37° C. until the antibiotic K–16 is produced by the organism in said medium.

4. A process according to claim 3 in which said *Streptomyces rimosus* is cultivated under submerged aerobic conditions at at temperature of about 18° to 37° C. for about 1 to 5 days and in which the aqueous nutrient medium contains about 0.5% by weight of a source assimilable carbohydrate and 0.5 to 3% by weight of a source of assimilable nitrogen compounds.

5. A process according to claim 3 in which said antibiotic is separated from the cultivating medium by steps of clarifying said medium optionally, concetrating said medium to about $\frac{1}{10}$ to $\frac{1}{20}$ of its volume at a maximum temperature of 50° C., acidifying said medium to a pH of about 2, clarifying said medium, adjusting said medium to a pH of about 10, reclarifying said medium, mixing a water-miscible organic solvent with said medium and separating the precipitate containing K–16.

6. A process according to claim 5 in which said antibiotic K–16 is further purified by the steps of dissolving said precipitate containing K–16 in an aqueous alkali solution, passing said solution through a strongly basic anion exchange resin in OH form, and eluting the antibiotic K–16 from said resin with an acid.

References Cited

Miller, Pfizer Handbook of Microbial Metabolites, McGraw Hill Book Co., Inc., New York, pp. 41, 125, 281, 321 and 584 (1962).

JEROME D. GOLDBERG, Primary Examiner

U.S. Cl. X.R.

195—80